United States Patent [19]
Bates

[11] 3,730,213
[45] May 1, 1973

[54] METER SETTER
[76] Inventor: Robert E. Bates, 3608 Placid Place, East Owensboro, Ky. 42301
[22] Filed: May 22, 1972
[21] Appl. No.: 255,809

[52] U.S. Cl. ............137/364, 285/30, 285/61, 73/201
[51] Int. Cl. .............................F16l 55/00
[58] Field of Search...............285/23, 30, 61; 137/364; 73/201; 248/68, 317

[56] References Cited

UNITED STATES PATENTS

| 1,204,464 | 11/1916 | Lofton | 73/201 X |
| 912,383 | 2/1909 | Kennedy et al | 73/201 |
| 1,158,471 | 11/1915 | Felstead | 73/201 X |
| 1,993,242 | 3/1935 | Kennedy | 73/201 |

Primary Examiner—Henry T. Klinksiek
Attorney—James S. Hight et al.

[57] ABSTRACT

A device for supporting and positioning a water meter to facilitate its connection in an underground water line. The device includes a meter platform supported on legs, and has pipe positioning means at opposite sides of the platform for positioning vertical pipes to be connected to the inlet and outlet sides of the meter. The positioning means preferably include snap-in connections for the pipes, and permit each pipe to be shifted in a vertical direction to accommodate meters and installations of different dimensions.

7 Claims, 3 Drawing Figures

Patented May 1, 1973  3,730,213

METER SETTER

The invention relates to a water meter "setter," which is a device used to position a water meter in an underground chamber, and thereby to facilitate connection of the meter into an underground water line.

According to conventional practice, the water inlet line to a home or other building includes a meter which is usually connected into the underground line outside the building. A shut-off valve is generally connected into the line adjacent the meter. This arrangement enables the meter to be read and serviced without entering the building and, if need arises, the valve can be closed to disconnect the line from outside the building. The meter is usually placed in an underground casing called a "meter box" and it is inspectable through a removable cover at the top of the box.

It has for years been conventional practice to employ some form of setter to position the meter and shut-off valve (if used) at proper height in the box. Typical prior art setters are shown in the U.S. Pats. to Austin, No. 520,176; Felstead, No. 1,158,471; and Doul, No. 1,267,389. The setter supports the meter in the box several inches above the main water line, at a level at which it can easily be read and serviced. The depth of the line itself is determined by the frost level in the particular area; the meter may be above the frost level but it is protected by the air space in the box around it. Short, generally vertical lengths of pipe interconnect the inlet and outlet sides of the meter to the main line below it in the box.

Use of prior art setter devices has been relatively cumbersome and inefficient. With them it has been necessary manually to hold the meter in vertical or upright position, while the setter is being hooked into the underground line. The meter is relatively heavy, and it exerts a substantial turning movement about the couplings to the main line. This makes the connection especially difficult where the line is a plastic line such as polybutylene or polyethylene service line. It is particularly difficult or awkward for the installer to keep the meter from tilting out of vertical position during setting. Moreover, by reason of the tendency of plastic line to creep under load, even after installation the meter can sag out of position over a period of time.

The present invention is directed to the provision of a new setter which obviates these problems. It supports the meter in a stable, upright attitude prior to hookup to the water line. It also positions the meter inlet and outlet lines in a generally vertical attitude prior to connection into the underground line, yet at the same time enables them to be shifted vertically for alignment as necessary to accommodate meters and installations of different sizes. It preferably includes a bracket for the seating and support of a cut-off valve, if one is used.

Stated broadly, the setter device in accordance with this invention includes a platform adapted to support a water meter placed on it, legs for positioning the platform in a stable horizontal position in a meter box, and pipe positioning means at two opposite sides of the platform. Each pipe positioning means is adapted to position a pipe in generally vertical attitude, for connection to the inlet or the outlet side of a meter supported by the platform, and provides for vertical shifting or up and down adjustment of the pipe therein as necessary for coupling to meters of different heights.

The invention can best be further described by reference to the accompanying drawings, in which.

Figure 1:
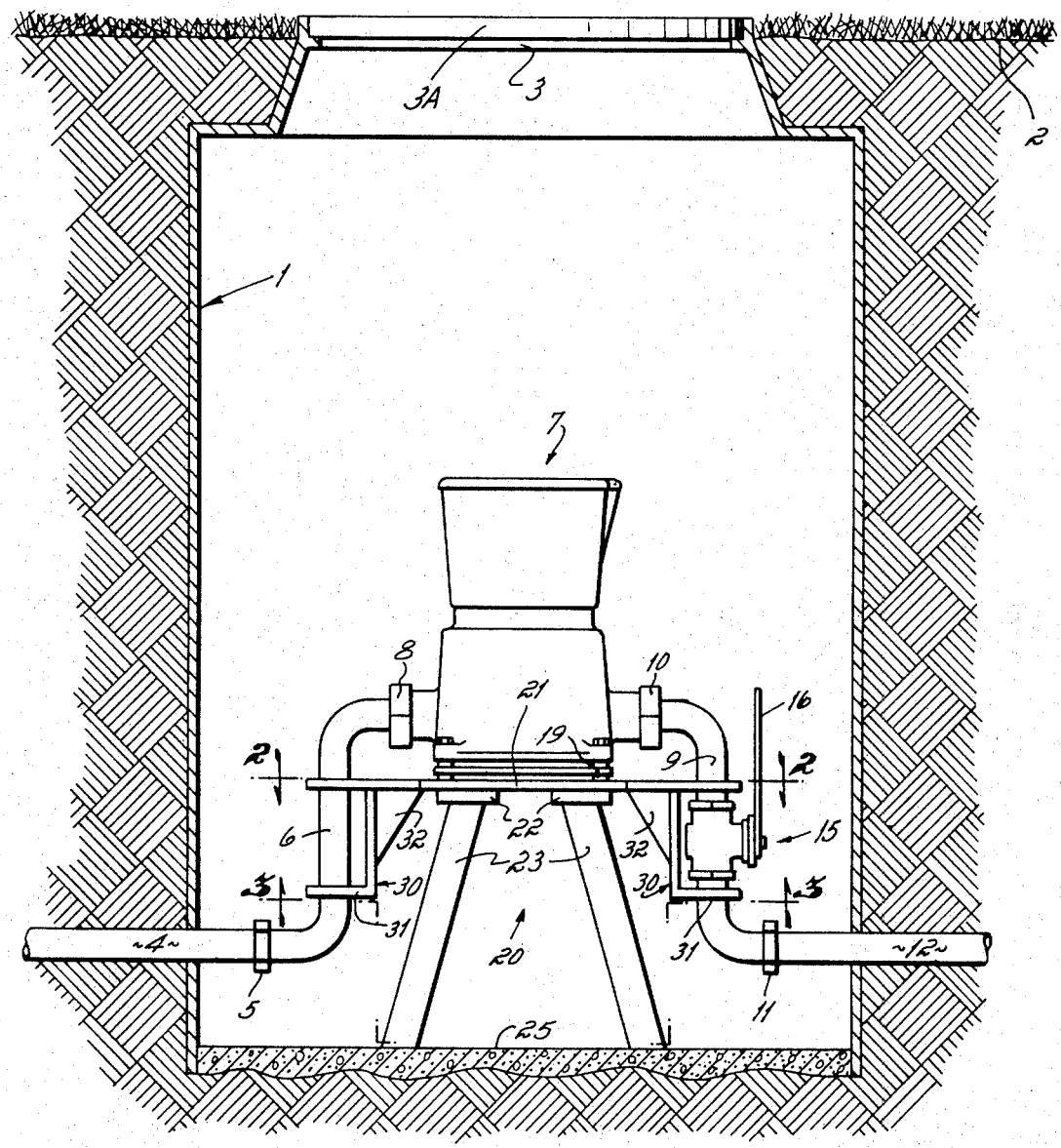
FIG. 1 is a vertical elevation, partly in section, of an underground meter installation, showing a water meter and a cut-off valve both supported by a preferred form of setter in accordance with the invention, in a meter box.

As a typical environment of the setter, a conventional underground casing or meter box is indicated generally in the drawings at 1. The box is buried below ground level 2, and has a ground level entrance 3, typically closed by a removable lid 3A, and through which the meter can be serviced and read. A water pipe or line 4 enters box 1 through an opening at one side thereof, and is coupled at 5 to a generally vertical pipe run 6 which carries flow upwardly to the meter 7, to which vertical pipe run 6 is connected by a coupling 8. On the other side of meter 7, flow is carried downwardly by a second vertically disposed pipe 9, to which the meter is connected at 10. Vertical run 9 is coupled at 11 to the line 12 which passes through an opening in box 1 that is diametrically opposite the point at which line 4 enters the box.

One of the two vertical pipes 6 or 9 may and usually will include a shut-off valve, indicated generally at 15 in line 9. Valve 15 has an operating arm or lever 16.

The water lines 4, 6, 9 and 12 may be plastic or metal, in accordance with customary practice. The meter 7 and valve 15 may each be conventional in construction.

Meter 7 rests on and is supported by a setter in accordance with the invention, designated generally at 20. The setter includes a generally horizontal platform or surface 21 on which the base 19 of meter 7 is positioned and supported. On the underside of platform 21 are provided a plurality of sockets, suitably three in number (see FIG. 3), each designated at 22, and each of which receives the upper end of a supporting leg 23. The sockets 22 are angulated outwardly, so that the legs form a stable, generally horizontal, tripod mount for the platform. Typically the legs 23 rest on dirt, gravel or a concrete slab at the bottom of box 1, as indicated generally at 25.

Figures 2, 3:
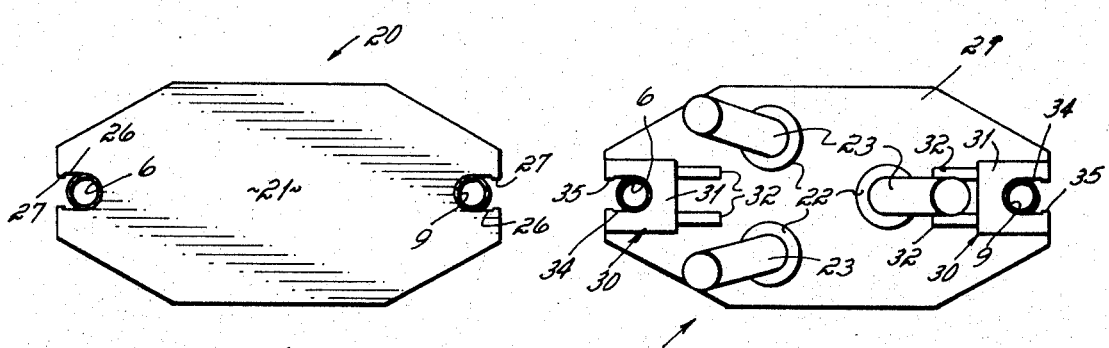
FIG. 2 is a horizontal section taken on line 2—2 of FIG. 1.
FIG. 3 is a horizontal section taken on line 3—3 of FIG. 1.

As best shown in FIGS. 2 and 3, the setter also includes pipe positioning means in the form of two openings or slots 26 at opposite sides of platform 21, through which the vertical pipe runs 6 and 9 pass. Preferably slots 26 are sized to receive conventional ¾ inch diameter pipe, and one or both slots desirably include a narrow snap portion as indicated at 27 at its entrance, having a dimension just less than that of the pipe which it is to receive. When pipe 6 or 9 is pressed into a slot 26, past the restricted entrance 27 thereof, the material yields elastically as a snap and thereafter retains the pipe in the slot. The pipe then cannot fall out of the slot, but it can be shifted or slid in a vertical direction through the slot. This facilitates its coupling (at 8 or 10 respectively) to different types of commercial meters 7, which may be of various heights.

Brackets 30 are fabricated or molded integrally with setter platform 21, and each projects downwardly below a respective slot 26, as shown in FIG. 1. Each bracket 30 carries a horizontal flange 31, extending below and parallel to the platform 21, and is braced by angular supports or gussets 32. As shown in FIG. 3, each flange 31 preferably has a slot or an opening 34 in it with a snap portion 35 at its entrance, corresponding to the openings 26 and snaps 27 in platform 21. The respective openings 26, 34 and snaps 27, 35 are aligned vertically with one another, and they constrain the pipes 6 and 9 to vertical orientation, but permit vertical shifting movement of the pipe. The flanges 31 should be spaced below the platform 21 a distance sufficient for valve 15 to be embraced within the bracket, between flange 31 and platform 21, with the valve operating arm 16 having clearance outwardly of the bracket. Together, the platform and flange take the reaction force when arm 16 of valve 15 is operated, and thereby relieve strain that the pipe would otherwise have to carry.

The legs 23 as well as the overall platform 21 can be made of plastic, e.g., high impact polystyrene or ABS material. The legs 23 are solvent welded in their sockets 22, or a snap fit can be used. The legs are sized to support the meter 7, at such height in box 1 that it can conveniently be read through the opening 3.

The setter 20, with the pipe lengths 6 and 9 snapped into it, and valve 15 in place, is conveniently handled as a subassembly. The meter to be used is hooked between lines 6 and 9 by couplings 8 and 10 respectively. The pipes can be shifted vertically in their slots 26 and 34 with respect to the table, to accommodate meters with couplings at different heights.

After the water lines 4 and 12 have been laid in place, the setter legs are placed on the pad or base 25. The couplings 5 and 11 are made; these may be solvent welds or flared or compression type couplings, or they may be threaded couplings, as shown. The setter holds the meter while this is done. The box 1 is then set in the hole (the sides of the box are slotted to receive lines 4 and 12). The stability of the tripod arrangement of the legs 23 prevents meter tip or sag, even with plastic piping.

Having described the invention, what is claimed is:

1. A meter setter comprising,
   a platform adapted to support a water meter to be placed thereon in use,
   said platform having legs extending downwardly from it for resting on a surface at the bottom of a meter box thereby to position said platform in a stable position within said meter box prior to the coupling of the meter to the pipes which it will serve in use, said legs being separate from said pipes,
   and two spaced apart pipe positioning means on said platform, each said pipe positioning means comprising a portion of said platform presenting a sidewise opening through which can be slid the side surface of a pipe below the coupling end of the pipe, said opening sized to position a pipe in generally vertical attitude for connection to a meter supported by said platform between the two pipe positioning means, each said opening providing for vertical shifting of the respective pipe when the pipe is received therein.

2. A setter in accordance with claim 1 wherein at least one said pipe positioning means includes means for retaining a pipe placed therein.

3. A meter setter in accordance with claim 2 wherein the retaining means comprises a snap fit connection to said opening for retaining the said pipe within the said opening.

4. A meter setter in accordance with claim 1 wherein each said opening is a slot provided with a snap at the entrance thereto, for retaining a pipe extending generally perpendicularly through said slot.

5. The meter setter of claim 4 wherein the said opening is provided in a bracket connected to said platform and which presents a flange portion spaced parallel to and below said platform, the platform and the flange portion each having a snap-in passage thereinto for releasably retaining a pipe therein.

6. The meter setter of claim 1 wherein said platform includes a bracket connected to it for positioning a cut-off valve with respect to said platform.

7. The meter setter of claim 1, wherein the legs extending downwardly from said platform are received in sockets provided on the underside of the platform.

* * * * *